United States Patent
Wigderson et al.

(10) Patent No.: US 12,316,931 B2
(45) Date of Patent: May 27, 2025

(54) METHOD OF REMOVING UNDERWATER BUBBLES AND A DEVICE THEREFOR

(71) Applicant: Coral Smart Pool Ltd, Binyamina (IL)

(72) Inventors: Oded Wigderson, Haifa (IL); Tamar Avraham, Haifa (IL); Eyal Golan, Zichron Yaacov (IL); Sagi Smolarski, Raanana (IL); Roman Pesikov, Tirat Carmel (IL)

(73) Assignee: CORAL SMART POOL LTD, Binyamina (IL)

( * ) Notice: Subject to any disclaimer, the term of this patent is extended or adjusted under 35 U.S.C. 154(b) by 305 days.

(21) Appl. No.: 17/849,883

(22) Filed: Jun. 27, 2022

(65) Prior Publication Data

US 2022/0408000 A1    Dec. 22, 2022

Related U.S. Application Data

(63) Continuation-in-part of application No. PCT/IL2020/051260, filed on Dec. 7, 2020.

(60) Provisional application No. 62/953,525, filed on Dec. 25, 2019.

(51) Int. Cl.
| | |
|---|---|
| *A61B 8/00* | (2006.01) |
| *G06V 20/05* | (2022.01) |
| *H04N 23/51* | (2023.01) |
| *H04N 23/52* | (2023.01) |
| *B63C 9/00* | (2006.01) |

(52) U.S. Cl.
CPC ............ *H04N 23/52* (2023.01); *G06V 20/05* (2022.01); *H04N 23/51* (2023.01); *B63C 9/00* (2013.01)

(58) Field of Classification Search
CPC ........ H04N 23/52; H04N 23/51; G06V 20/05; B63C 9/00; A61B 8/00
USPC .......................................................... 348/81
See application file for complete search history.

(56) References Cited

U.S. PATENT DOCUMENTS

| | | | |
|---|---|---|---|
| 3,236,167 A | 2/1966 | Lode | |
| 8,945,013 B2 * | 2/2015 | Oakley | ............... G10K 11/355 600/444 |
| 2008/0015444 A1 | 1/2008 | Cho | |

(Continued)

FOREIGN PATENT DOCUMENTS

| | | |
|---|---|---|
| JP | 2005091293 | 4/2005 |
| WO | 2017/130187 | 8/2017 |

*Primary Examiner* — Trang U Tran
(74) *Attorney, Agent, or Firm* — FISHERBROYLES, LLP; Roger L. Browdy; Ronni S. Jillions

(57) ABSTRACT

A method of removing underwater gas bubbles from underwater devices such as cameras, optical lenses, or domes including acquiring a camera image or a sequence of images, applying a computer vision algorithm for detecting bubbles that stick to underwater cameras, optical lenses or domes and vibrating a motor for a time period sufficient to remove the majority of the bubbles, and optionally repeating vibrating the motor until complete removal or dismissal of bubbles is achieved. A method of moving a moving element with respect to an underwater surface associated with an underwater acquisition device, wherein a motion of the moving element enables at least part of the moving element to interact with at least one of the surface or the underwater gas bubbles, thereby dismissing or removing underwater gas bubbles from at least part of the surface. Corresponding systems are also disclosed.

20 Claims, 13 Drawing Sheets

(56) References Cited

U.S. PATENT DOCUMENTS

2010/0089164 A1* 4/2010 Aoike ................ G21C 17/003
73/632
2014/0283585 A1* 9/2014 Sæther ................ G01N 29/028
73/61.79

* cited by examiner

METHOD OF REMOVING UNDERWATER BUBBLES AND A DEVICE THEREFOR

FIELD OF THE INVENTION

The present invention relates to systems and methods of dismissing or removing underwater gas bubbles.

BACKGROUND OF THE INVENTION

Application WO2017/130187 (granted as U.S. Pat. No. 11,216,654—WO2017/130187 and U.S. Pat. No. 11,216, 654 are incorporated hereinafter by reference) recites a system for detection of human drowning, which utilizes a detection method comprising detecting humans in a sequence of underwater images taken by a single camera, for identifying humans-in-water candidates in the images, said detection using a machine learning algorithm for tracking humans-in-water candidates throughout this sequence, and detecting human drowning risk. The system recited in the WO2017/130187 application is capable of detecting human drowning using at least one underwater camera configured to take at least a sequence of underwater images, the system being configured to attempt detecting humans in the sequence of underwater images, for identifying humans-in-water candidates in the images, said detection using at least a machine learning algorithm to detect and track humans-in-water candidates throughout this sequence in order to significantly reduce human drowning risk.

As depicted in FIG. 1, the system for detection of human drowning recited in application WO2017/130187, comprises the following components:
- a central processing unit 21;
- an underwater camera 22;
- an alarm 23;
- a power supply 24;
- a control panel 25;
- a wireless communication unit 26; and
- a mechanical float 27.

An inherent problem associated with the usage of an underwater acquisition device, especially devices that are not on the move, namely devices that are fixed or mounted to an underwater wall, is the formation of bubbles that tend to stick on a surface associated with the underwater acquisition device.

The formation of underwater bubbles is due to a certain amount of air or other gas dissolved in water. The dissolved air content in water can be increased by the process of aeration. The efficiency of air transfer depends on several factors, including bubble dimension and flow rate. Aeration, as well as bubbles cavitation, may naturally occur in, e.g., swimming pools, when air in the form of small bubbles can pass through the water due to several processes.

Air bubbles in swimming pools can be generated in various ways, e.g., while water is allowed to flow back to the swimming pool, when swimmers jump into the water, by the pool's filter pump, by the pool's cleaning tabulator (moving in and out of the water), and due to changes in the pool's temperature gradients.

Gas bubbles such as oxygen or air bubbles that are attached to the surface associated with an underwater acquisition device will lead to poor images taken by the underwater acquisition device, and therefore an efficient method is needed to remove the bubbles.

There are provided in the art devices for removal of gas bubbles such as in application US 200810015444, application US 2014/0048495 and U.S. Pat. No. 5,531,119, JR 2005/091293, U.S. Pat. No. 3,236,167 does not remove gas bubbles and attempts to minimize the bubble formation.

There is a need in the art to propose improved methods and systems for the detachment of gas bubbles that tend to stick on a surface associated with an underwater acquisition device. The present invention provides such methods and systems, as will be apparent from the description of the invention provided herein.

GENERAL DESCRIPTION

One aim of some embodiments of the present invention is to provide methods and devices for removing underwater bubbles from a surface associated with an underwater acquisition device. According to some embodiments, the proposed solution significantly reduces the bubble removing time.

In accordance with certain aspects of the presently disclosed subject matter, there is provided a method of dismissing or removing gas bubbles that stick to an underwater surface associated with an underwater acquisition device, wherein the method comprises using an electro-mechanical mechanism to generate mechanical vibrations in the surface associated with the underwater acquisition device, or generate mechanical vibrations in an assembly coupled to the underwater acquisition device, said mechanical vibrations enabling dismissing or removing at least part of said gas bubbles.

According to some embodiments, the electro-mechanical mechanism is directly or indirectly coupled to, or in a vicinity of the underwater acquisition device.

According to some embodiments, the electromechanical mechanism includes a vibrating unbalanced DC motor, or a piezoelectric transducer, or a solenoid, or an ultrasonic device.

According to some embodiments, the method comprises:
a) operating a vibrating or rotating mechanism for a time period sufficient to remove a majority of the gas bubbles; and
b) optionally repeating step a) until complete removal or dismissal of the gas bubbles is achieved.

According to some embodiments, the method comprises:
a) acquiring an underwater image or a sequence of underwater images and applying a computer vision algorithm to the underwater image or to the sequence of underwater images for detecting gas bubbles that stick to the surface associated with the underwater acquisition device,
b) responsive to said detecting, automatically operating a vibrating or rotating mechanism to remove at least part of the gas bubbles from the surface associated with the underwater acquisition device, and
c) optionally repeating step b) until complete removal or dismissal of the gas bubbles is achieved.

According to some embodiments, the method comprises:
a) acquiring an underwater image or a sequence of underwater images and feeding the underwater image or a sequence of underwater images to a machine learning algorithm for detecting gas bubbles that stick to the surface associated with the underwater acquisition device,
b) responsive to said detecting, automatically operating a vibrating or rotating mechanism to remove at least part of the gas bubbles from the surface associated with the underwater acquisition device,
c) optionally repeating step b) until complete removal or dismissal of the gas bubbles is achieved.

According to some embodiments, the method comprises periodically activating the electro-mechanism, with a constant duty cycle.

According to some embodiments, the electro-mechanical mechanism is a vibrating or rotating mechanism which detaches the gas bubbles instantly, wherein, when a computer-implemented software detects accumulation of gas bubbles, the method comprises automatically re-operating the vibrating or rotating mechanism for complete removal of the gas bubbles.

According to some embodiments, the gas comprises air, oxygen, nitrogen and $CO_2$.

In accordance with certain aspects of the presently disclosed subject matter, there is provided a device operative to dismiss or remove gas bubbles that stick to a surface associated with an underwater acquisition device, the device comprising an electro-mechanical mechanism, wherein activation of the electro-mechanical mechanism is operative to generate mechanical vibrations in the surface associated with the underwater acquisition device, or generate mechanical vibrations in an assembly coupled to the underwater acquisition device, said mechanical vibrations enabling dismissing or removing at least part of said gas bubbles.

According to some embodiments, the device further comprises a processor and memory circuitry configured to detect presence of gas bubbles that stick to the surface associated with the surface associated with an underwater acquisition device, using a computer vision algorithm.

In accordance with certain aspects of the presently disclosed subject matter, there is provided a system operative to dismiss or remove underwater gas bubbles, the system comprising a moving element operative to move with respect to at least part of an underwater surface associated with an underwater acquisition device, an actuator coupled to the moving element, wherein a control of a motion of the moving element using the actuator enables at least part of the moving element to interact with at least one of the surface or the underwater gas bubbles, thereby dismissing or removing underwater gas bubbles from at least part of the surface.

According to some embodiments, said interaction includes a wiping of the surface on which the gas bubbles are located, by the at least part of the moving element.

According to some embodiments, said interaction includes a contact between the at least part of the moving element during its motion and the underwater gas bubbles located on at least part of the surface.

According to some embodiments, said interaction includes a sweeping motion of the at least part of the moving element at a distance from the underwater gas bubbles which is sufficiently small to enable said sweeping motion to dismiss or remove underwater gas bubbles from at least part of the surface.

According to some embodiments, the moving element has an arcuate shape.

According to some embodiments, the system is configured to rotate the moving element with respect to the surface from a first extreme position to a second extreme position, or conversely.

According to some embodiments, the actuator includes a motor and at least one first magnetic element coupled to the motor, wherein the system comprises at least one second magnetic element coupled to the moving element.

According to some embodiments, the first magnetic element is located within a waterproof enclosure of the underwater acquisition device, the second magnetic element is immersed in water, and a motion of the first magnetic element enables a motion of the second magnetic element using a remote magnetic force.

According to some embodiments, the system does not degrade waterproofness of the underwater acquisition device, or of an enclosure in which the underwater acquisition device is located.

According to some embodiments, the system comprises at least one sensor operative to provide data informative of a position of the moving element.

According to some embodiments, the system comprises a magnet coupled to the moving element, and at least one magnetic sensor operative to detect the magnet, thereby providing data informative of a position of the moving element.

According to some embodiments, the system comprises a printed circuit board (PCB), wherein the PCB embeds a camera of the underwater acquisition device, and wherein the PCB comprises a hole which accommodates at least part of the actuator.

According to some embodiments, the system is configured to use a computer vision algorithm to perform a detection of underwater gas bubbles on the surface, and to use the detection to trigger the motion of the moving element with respect to the surface, thereby dismissing or removing underwater gas bubbles from at least part of the surface.

According to some embodiments, the system includes one or more fixing elements for coupling the moving element to the surface, wherein the one or more fixing elements enable manual replacement of the moving element.

According to some embodiments, the system is configured to rotate the moving element above the surface from a first extreme position to a second extreme position, or conversely.

In accordance with certain aspects of the presently disclosed subject matter, there is provided a method of dismissing or removing underwater gas bubbles, the method comprising using an actuator to induce a motion of a moving element with respect to at least part of an underwater surface associated with an underwater acquisition device, wherein said motion enables at least part of the moving element to interact with at least one of the surface or the underwater gas bubbles, thereby dismissing or removing underwater gas bubbles from at least part of the surface.

In accordance with certain aspects of the presently disclosed subject matter, there is provided a non-transitory computer readable medium comprising instructions that, when executed by a processor and memory circuitry (PMC), cause the PMC to perform operations comprising obtaining an underwater image or a sequence of underwater images, using a computer vision algorithm to perform a detection, in the underwater image or in the sequence of underwater images, of gas bubbles that stick to a surface associated with an underwater acquisition device, and depending on an output of said detection, generating data informative of a presence of gas bubbles that stick to said surface, According to some embodiments, there is provided a system including a processor and memory circuitry configured to perform the operations described above, and a method which uses a processor and memory circuitry to perform the operations described above.

DETAILED DESCRIPTION OF EMBODIMENTS

Figure 1:
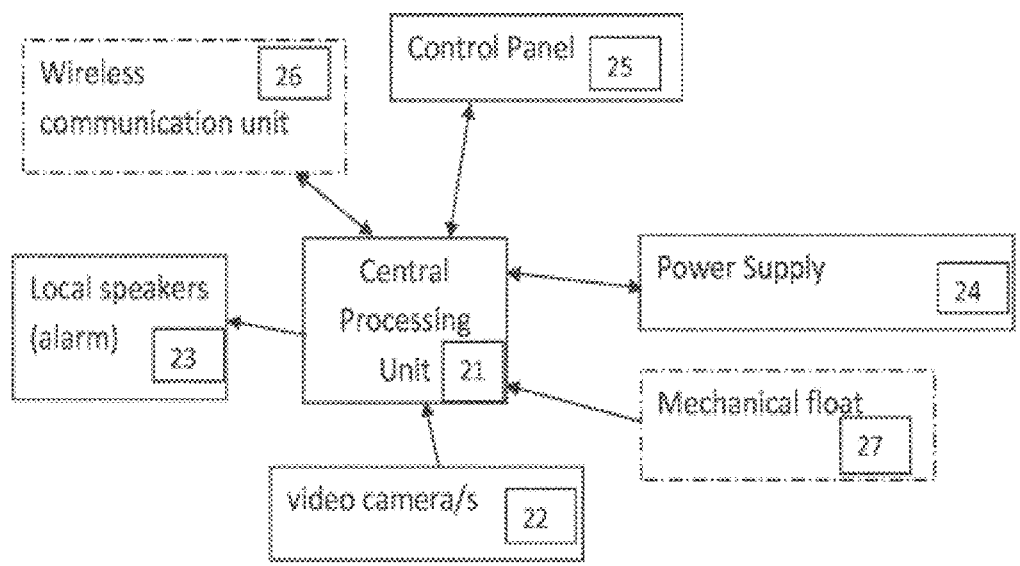
FIG. 1 is a schematic explanatory view of an example of a system for underwater detection of human drowning.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components, and circuits have not been described in detail so as not to obscure the presently disclosed subject matter.

One aim of the various embodiments of the present invention is to solve the problem of accumulation of gas bubbles, such as air bubbles, on an underwater surface associated with an underwater acquisition device.

According to some embodiments, the proposed solution enables to efficiently dismiss or remove gas bubbles from an underwater surface associated with an underwater acquisition device, as well as significantly reduce the bubble removing time.

According to the present invention, the term "aeration" refers to a process by which air or other gas is mixed with or dissolved in a liquid medium such as water.

According to the present invention, the term "dome" can correspond to a device which covers e.g. a camera and a lens unit (the dome can be transparent).

According to the present invention, the term "cavitation bubbles" refers to the formation of bubbles due to changes in a liquid that lead to the formation of small vapor-filled cavities.

According to the present invention, the term "Selfacecoat PURA (PT6)" refers to a hydrophilic coating, manufactured by Marusyo Sangyo Co. Ltd., Japan, which is applied by using a spray gun or a brush.

According to the present invention, the term "Aculon ON-460" refers to a two-part coating, manufactured by Aculon, San Diego, USA, which is used to impart hydrophilicity on various substances such as polymers.

According to the present invention, the term "PMMA" refers to an acrylic polymer.

According to some embodiments, underwater gas bubbles, such as air bubbles stick to an underwater surface associated with an underwater acquisition device (e.g., underwater camera). The underwater surface can correspond e.g., to an immersed surface of a dome covering the underwater acquisition device, and/or to the surface of an optical element (e.g. optical lens) of the underwater acquisition device, and/or to an immersed surface of an underwater acquisition device, on which gas bubbles are formed.

According to some embodiments, the gas bubbles are removed by a device that includes a mechanism that, when operated for a short time (e.g., tens of milliseconds—this is not limitative), enable to removes the gas bubbles.

In order to solve the problem of underwater gas bubbles that stick to a surface associated with an underwater acquisition device, the inventors of the present invention used hydrophilic coatings such as Selfacecoat PURA (PT6) and Aculon ON-460 that were proved to be not useful because these coatings degrade in swimming pool water over a relatively short period.

In another approach to solve the problem of underwater gas bubbles that stick to a surface associated with an underwater acquisition device, the inventors of the present invention used PMMA as dome material, which was also proved to be not useful in preventing the sticking of bubbles to its surface.

Figure 2A:
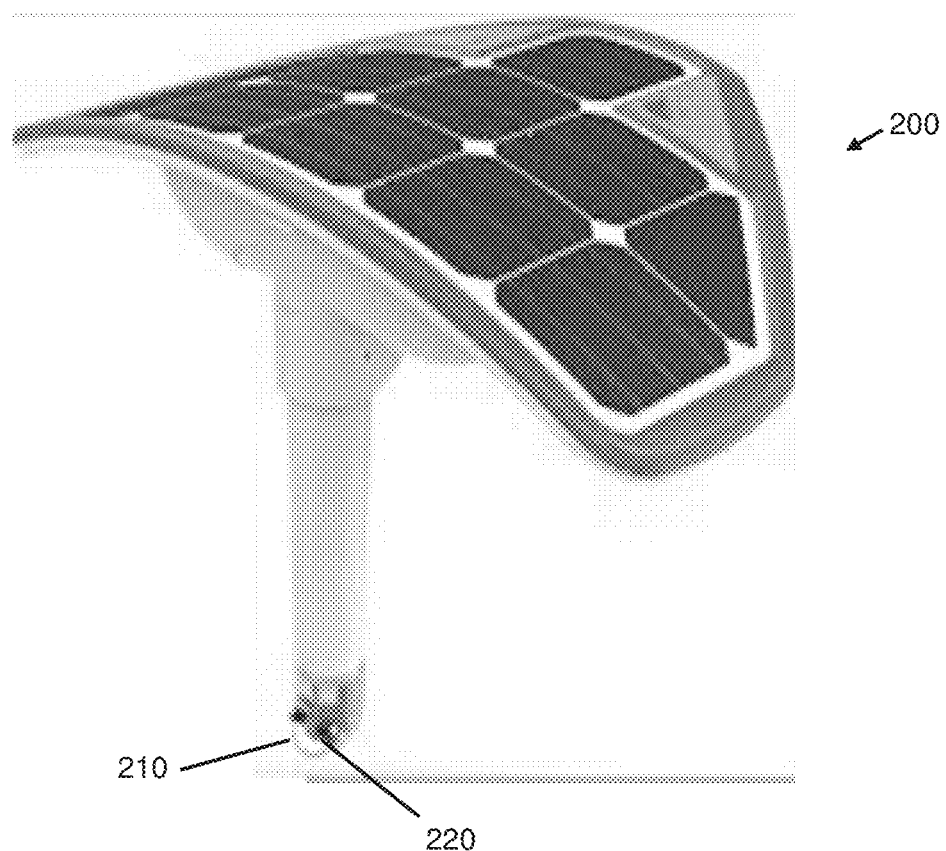
FIG. 2A depicts an embodiment of a system for detection of underwater human drowning.

Attention is now drawn to FIG. 2A, which depicts an embodiment of a system 200 for detection of underwater human drowning. The various embodiments (described hereinafter) of the solution for dismissing or removing gas bubbles can be integrated in the system 200, in order to dismiss or remove gas bubbles present in an underwater surface (see e.g., reference 210) associated with an underwater acquisition device (see e.g., reference 220) of the system 200. This is however not limitative, and these various embodiments can be included in (or used together with) any another system which includes an underwater camera and which involves an analysis (computerized analysis and/or human analysis) of underwater images acquired by the underwater camera.

Since the surface is located in the optical field of view of the underwater acquisition device, presence of gas bubbles degrades quality of the images acquired by the underwater acquisition device. As a consequence, if the gas bubbles are not removed, this can induce a degradation of performance of the system 200 for detection of underwater human drowning, or of any other system which includes an underwater camera and that requires an analysis (computerized analysis and/or human analysis) of underwater images acquired by the underwater camera.

Note that the system 200 can be compliant with the various embodiments described in WO2017/130187.

In accordance with certain aspects of the presently disclosed subject matter, there is provided a method of dismissing or removing gas bubbles that stick to a surface associated with an underwater acquisition device, which uses an electro-mechanical mechanism that is coupled to (directly, or indirectly e.g. via an assembly which is connected both to the underwater acquisition device and to the electro-mechanical mechanism), or in a vicinity of the underwater acquisition device.

Figure 2B:
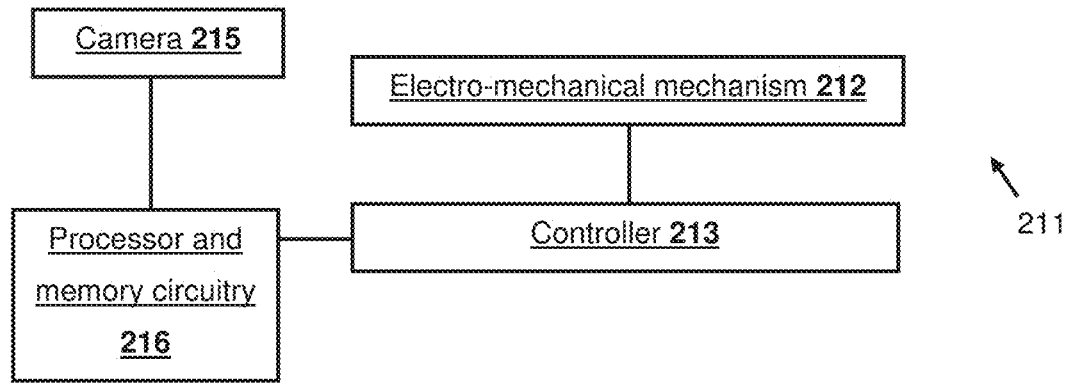
FIG. 2B depicts a generalized block diagram of an embodiment of a device for removing underwater gas bubbles.

Attention is drawn to FIG. 2B, which depicts an embodiment of a device 211 operative to dismiss or remove gas bubbles that stick to a surface associated with an underwater acquisition device.

The device 211 includes an electro-mechanical mechanism 212, and a controller 213 (e.g., hardware controller or micro-controller). The controller 213 can activate operation of the electro-mechanical mechanism 212, in order to dismiss or remove gas bubbles that stick to an underwater camera, an optical lens, or a dome.

The device 211 can be part of a system for detecting underwater human drowning, such as the system of FIGS. 1 and 2A., and/or part of any other system which includes an underwater camera and which involves an analysis (computerized analysis and/or human analysis) of underwater images acquired by the underwater camera.

As explained hereinafter, an underwater camera 215 can acquire images in order to detect the presence of gas bubbles on a surface associated with the underwater acquisition device. In some embodiments, the camera 215 corresponds to the underwater camera for which it is desired to remove gas bubbles from the surface located in its optical field of view. In other embodiments, the camera 215 can be an additional camera, different from the underwater camera for which it is desired to remove gas bubbles from the surface located in its optical field of view.

As explained hereinafter, a processor and memory circuitry (PMC) 216 can process the images acquired by the camera 215 to detect the presence of gas bubbles. PMC 216 can be part of the device 211 or can be external to the device 211 and can communicate with the device 211. PMC 216 can implement a computer vision algorithm, such as trained machine learning algorithm. PMC 216 can then alert the controller 213. In some embodiments, the controller 213 and the PMC 216 are part of the same unit.

Figure 2C:
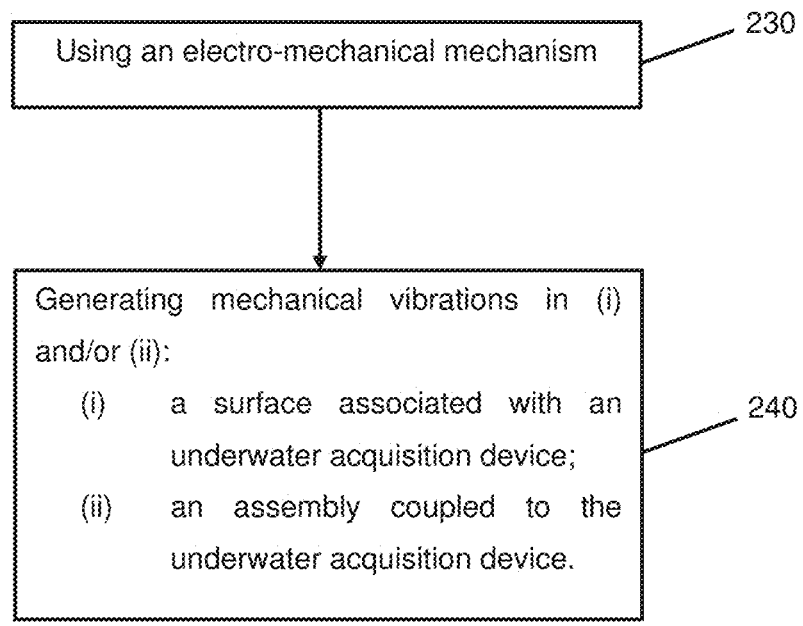
FIG. 2C illustrates a generalized flow-chart of a method for removing underwater gas bubbles.

Attention is drawn to FIG. 2C.

According to some embodiments (see FIG. 2C), the method includes using (operation 230) an electro-mechanical mechanism. As mentioned above, according to some embodiments, the electro-mechanical mechanism can be (directly or indirectly) coupled to or in a vicinity of the underwater acquisition device. According to some embodiments, upon activation of the electro-mechanical mechanism, mechanical vibrations are generated (see 240) in the surface associated with the underwater acquisition device. According to some embodiments, upon activation of the electro-mechanical mechanism, mechanical vibrations are generated (see 240) in an assembly coupled to the underwater acquisition device. In some embodiments, the whole assembly (or the majority thereof) is vibrated. The mechanical vibrations enable to dismiss or remove the gas bubbles (all of them, or at least part thereof) that stick to the surface associated with the underwater acquisition device. In particular, the mechanical vibrations generate a mechanical force which is stronger than the hydrophilic force, thereby removing the gas bubbles.

Figure 3:
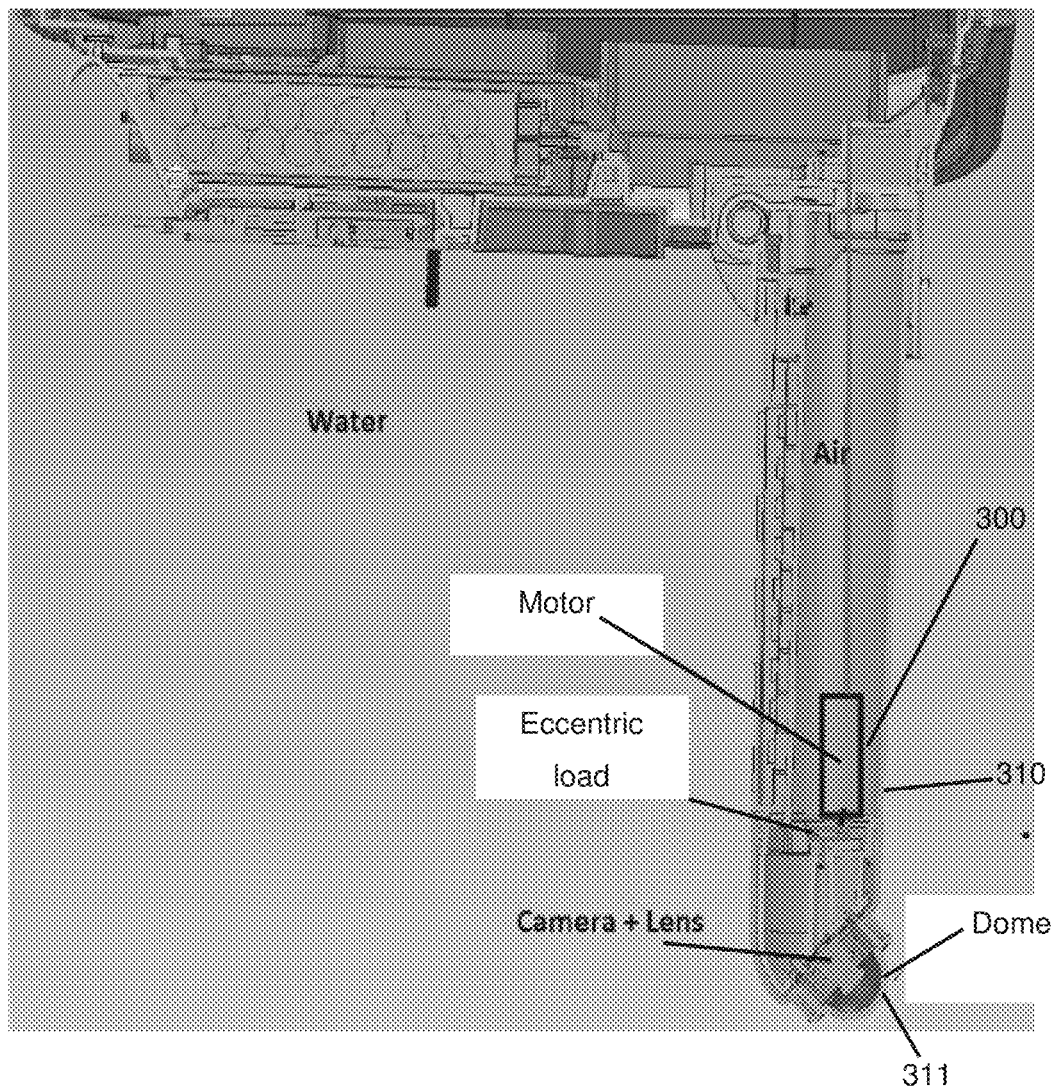
FIG. 3 is a schematic explanatory view of an example of a device for removing underwater bubbles according to the invention.
Figure 4:
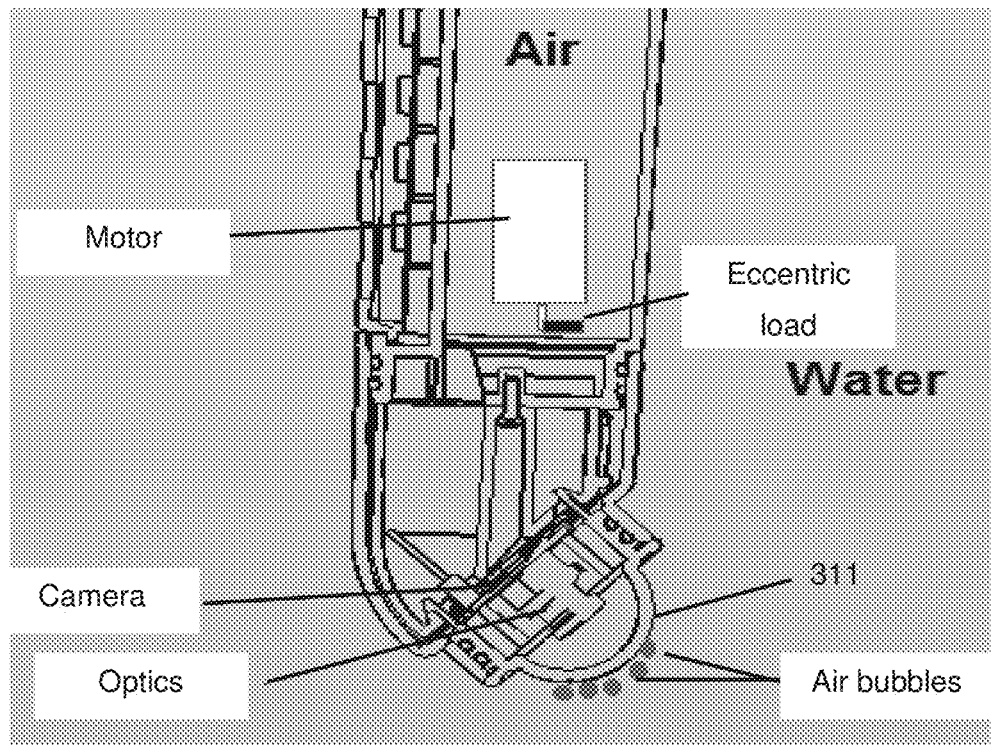
FIG. 4 is another view of an example of a device for removing underwater bubbles according to the invention.

A non-limiting example is depicted in FIGS. 3 and 4. In this example, the electro-mechanical mechanism 300 is located within an assembly (see pipe 310) coupled to the underwater acquisition device (see camera 320). The assembly is part of the system for detection of underwater human drowning and is located underwater. In other embodiments, the assembly can be part of another system which includes an underwater camera and which involves an analysis (computerized analysis and/or human analysis) of underwater images acquired by the underwater camera.

When the electro-mechanical mechanism 300 is activated (e.g., by a hardware controller or processor operatively coupled to the electro-mechanical mechanism 300), this generates mechanical vibrations in the assembly 310 (and in turn, in the surface 311 of the dome under which the underwater camera is located). As a consequence, gas bubbles are dismissed or removed.

In the non-limiting example of FIGS. 3 and 4, the electro-mechanical mechanism 300 is a vibrating mechanism, which includes a motor (rotating motor) and an eccentric load (unbalanced weight) coupled to the motor, which rotates around an axis of the motor.

According to some embodiments of the present invention, the method of dismissing or removing underwater gas bubbles from a surface associated with an underwater acquisition device comprises an electro-mechanical mechanism selected from a vibrating unbalanced DC motor, a piezoelectric transducer, a solenoid, and an ultrasonic device.

Figure 5A:
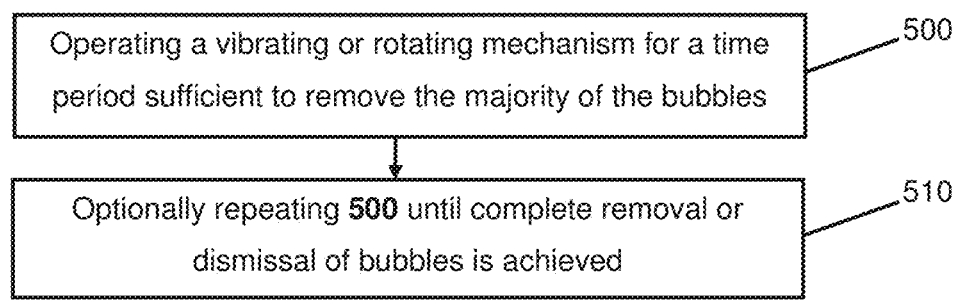
FIG. 5A illustrates a generalized flow-chart of a method for removing underwater gas bubbles.

Attention is now drawn to FIG. 5A.

According to some embodiments of the present invention, the method of dismissing or removing underwater gas bubbles from a surface associated with an underwater acquisition device comprises:

a) Operating (operation 500) a vibrating or rotating mechanism for a time period sufficient to remove the majority (e.g., vast majority) of the bubbles: and b) Optionally (operation 510) repeating step a) until complete removal or dismissal of bubbles is achieved.

Figure 5B:
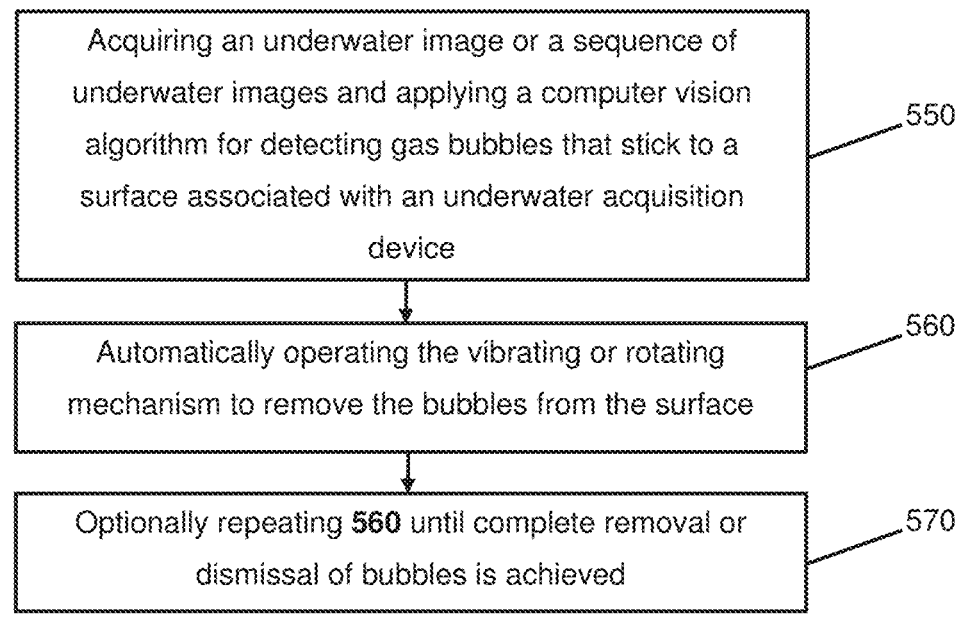
FIG. 5B illustrates a generalized flow-chart of another method for removing underwater gas bubbles.

Attention is now drawn to FIG. 5B.

According to some embodiments of the present invention, the method of dismissing or removing underwater gas bubbles from a surface associated with an underwater acquisition device comprises:

a) Acquiring (operation 550) an underwater image or a sequence of underwater images and applying a computer vision algorithm to the underwater image or to the sequence of underwater images for detecting gas bubbles that stick to the surface associated with the underwater acquisition device;

b) Responsive to said detecting, automatically operating (operation 560) the vibrating or rotating mechanism to dismiss or remove the bubbles from the surface associated with the underwater acquisition device (a command can be transmitted to the mechanism). In particular, the vibrating or rotating mechanism can be activated in response to detection of gas bubbles in the underwater image or the sequence of underwater images.

Note that the underwater image or the sequence of underwater images can be acquired by the underwater camera itself (for which it is desired to remove bubbles located on a surface associated with the underwater camera), or by a different underwater camera.

According to some embodiments, the computer vision algorithm can involve usage of a trained machine learning model which has been trained (using e.g., supervised learning) to detect underwater gas bubbles in underwater images. The trained machine learning model (e.g., deep neural network, convolutional neural network; etc.) can be implemented by a processor and memory circuitry (not represented in the drawings), which can be part of the device for removing gas bubbles, or can communicate with the device for removing gas bubbles.

According to some embodiments of the present invention, the method of dismissing or removing underwater gas bubbles from a surface associated with an underwater acquisition device comprises:

a) Acquiring (operation 550) an underwater image or a sequence of underwater images and applying a computer vision algorithm to the underwater image or to the sequence of underwater images for detecting gas bubbles that stick to the surface associated with the underwater acquisition device;

b) Responsive to said detecting, automatically operating (operation 560) the vibrating or rotating mechanism to dismiss or remove the bubbles from the surface associated with the underwater acquisition device (a command can be transmitted to the mechanism) to remove gas bubbles; and c) Optionally (operation 570) repeating step b) until complete or sufficient removal or dismissal of bubbles is achieved.

Note that the computer vision algorithm can be implemented by the processor and memory circuitry 216.

According to some embodiments, the electro-mechanism used for dismissing or removing underwater gas bubbles from the surface associated with the underwater acquisition device, is operated periodically, without involving computer vision that detects bubbles. In some embodiments, the repetition period (duty cycle) is constant (at least over a given period of time), Such a period can be, for example, once in 5 minutes, once in 15 minutes, or once in 60 minutes (these values are not limitative).

According to some embodiments of the present invention, the method of removing bubbles from the underwater acquisition device detaches the bubbles instantly. If a computer-implemented software (the software can be implemented on the processor and memory circuitry 216) detects accumulation of bubbles, a command is sent to automatically re-operate the vibrating or rotating mechanism for complete removal of the gas bubbles.

According to some embodiments of the present invention, the vibrating or rotating mechanism can include an electro-mechanical device (which can be a vibrating unbalanced DC motor), a piezoelectric transducer, a solenoid, an ultrasonic device and the like.

According to some embodiments of the present invention, the size of gas bubbles that stick to the surface associated with the camera, the optical lens or the dome can be for example in the range of 0.1-5 mm in diameter. This is not limitative.

Figure 10:
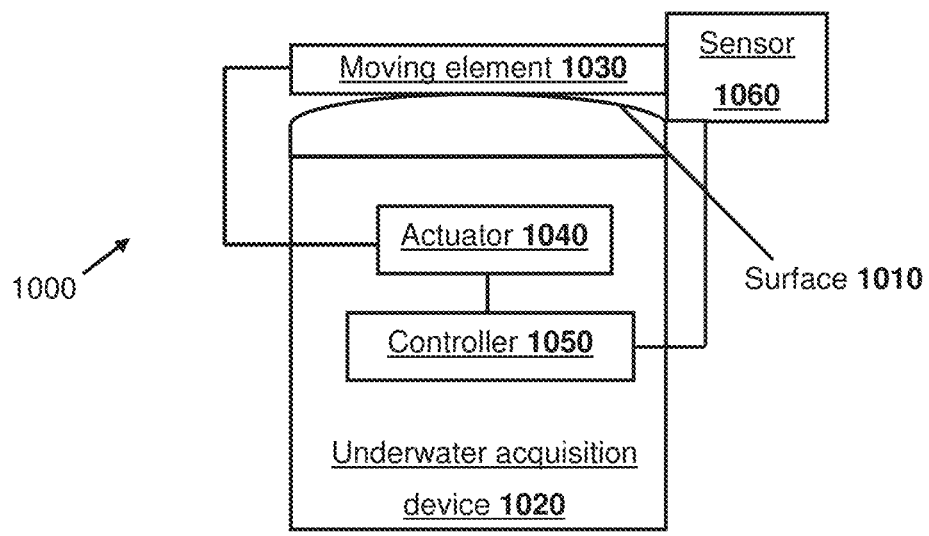
FIG. 10 depicts a generalized block diagram of another embodiment of a system for removing underwater gas bubbles.

Attention is now drawn to FIG. 10, which depicts a schematic representation of another system 1000 operative to dismiss or remove underwater gas bubbles. Note that system 1000 can be integrated in a system for detection of underwater human drowning, such as the system of FIG. 1 and FIG. 2A., or to any system that includes an application based on an underwater camera As mentioned above, gas bubbles can be attached or can overlay at least part of an underwater surface 1010 associated with an underwater (image) acquisition device 1020. Note that the surface 1010 is immersed within the water (that is to say that the surface 1010 is in direct contact with the water). Since the surface 1010 is located in the optical field of view of the underwater acquisition device 1020, the presence of gas bubbles on the surface 1010 perturbs image acquisition by the underwater acquisition device 1020. In some embodiments, the surface 1010 can be part of the underwater acquisition device 1020. In some embodiments, the surface 1010 can be external to the underwater acquisition device 1020. In some embodiments, the underwater acquisition device 1020 can include e.g., a camera, or a camera covered by a dome (the surface 1010 can therefore correspond to that dome, as visible e.g., in FIGS. 3 and 4), etc.

In some embodiments, system 1000 is an electro-mechanical system, which enables motion of the moving element 1030 with respect to the surface 1010.

System 1000 includes at least one moving element 1030 which is operative to move with respect to at least part of the underwater surface 1010. As explained hereinafter, in some embodiments, the moving element 1030 can rotate around at least one axis. Note that the moving element 1030 is located in the water.

According to some embodiments, the moving element 1030 is mechanically affixed to the surface, or to fixing elements (see e.g., ears 1370 in FIG. 13C) coupled to the surface. Each fixing element can include e.g., a female part which cooperates with a male part of the moving element 1030 (or each fixing element can include e.g., a male part which cooperates with a female part of the moving element 1030). The moving element 1030 can therefore be easily (manually) replaced. In some examples, the moving element 1030 can be secured to the surface or to the fixing elements using one or more mechanical clips.

System 1000 further includes an actuator 1040 coupled to the moving element 1030. The actuator 1040 can be an electro-mechanical actuator.

System 1000 can further include a controller 1050. The controller 1050 can send instructions to the actuator 1040, in order to instruct the actuator 1040 to move the moving element 1030. In some embodiments, the controller 1050 can receive data from at least one sensor 1060. The sensor 1060 can provide data informative of a position of the moving element 1030 (in particular the position of the moving element 1030 with respect to the surface 1010). The sensor 1060 can include e.g., a magnetic sensor or an optical sensor, etc. The sensor 1060 is generally located within the enclosure in which the underwater acquisition device 1020 is located. The controller 1050 generally includes a hardware-based electronic device with data processing capabilities, such as a micro-controller, a processor and memory circuitry, etc. Although the controller 1050 is depicted in FIG. 10 as part of the underwater acquisition device 1020, in some embodiments, it can be external to it, and can communicate remotely with the actuator 1040.

As a consequence, when motion of the moving element 1030 is induced (via the actuator 1040 following a command of the controller 1050), at least part of the moving element 1030 interacts with the underwater gas bubbles during the motion of the moving element 1030, thereby dismissing or removing underwater gas bubbles affixed to the surface 1010. This part can protrude from the moving element 1030. According to some embodiments, the extremity of this protruding part can be in contact with the surface 1010 during its motion. In other embodiments, the extremity of this protruding part is not in direct physical contact with the surface 1010 (but rather in close proximity to the surface 1010).

According to some embodiments, the moving element 1030 is a wiper (a particular embodiment is described hereinafter with reference to FIGS. 13A to 13C). The wiper can include at least one (or more) brush. The extremity of the brush can be in contact with the surface 1010, or, alternatively, can be in close proximity to the surface 1010, without being in direct physical contact with the surface 1010. During a motion of the wiper, the extremity of the brush wipes the surface 1010, or is in contact with the gas bubbles (without necessarily directly touching the surface 1010), thereby dismissing or removing the underwater gas bubbles affixed to the surface 1010. This is not limitative, and rubber or any other adapted material that can dismiss or remove the underwater gas bubbles can be used.

According to some embodiments, the moving element 1030 conforms to the shape of the surface 1010. For example, if the surface 1010 is hemispherical, the moving element 1030 can have an arcuate shape. In particular, the radius of curvature of the moving element 1030 can (substantially) conform with the radius of curvature of the surface 1010. This is not limitative.

When the underwater acquisition device 1020 is deployed in the water, the underwater acquisition device 1020, or the enclosure in which the underwater acquisition device 1020 is located (such as a dome), has to be waterproof. Indeed, presence of water in the underwater acquisition device 1020 would damage sensing portions and/or electronic parts of the underwater acquisition device 1020.

According to some embodiments, the system 1000 does not degrade waterproofness of the underwater acquisition device 1020, and/or the waterproofness of an enclosure in which the underwater acquisition device 1020 is located. In particular, in some embodiments, there is no direct physical or mechanical coupling between the actuator 1040 and the moving element 1030. To the contrary, the actuator 1040 remotely induces a motion of the moving element 1030, using for example a magnetic force, or an electro-magnetic force. As a consequence, there is no need to create a channel (or a hole) in an enclosure of the underwater acquisition device 1020, and the waterproofness of the underwater acquisition device 1020 (or of its enclosure) is not degraded by the system 1000. This will be further discussed hereinafter.

Figure 11:
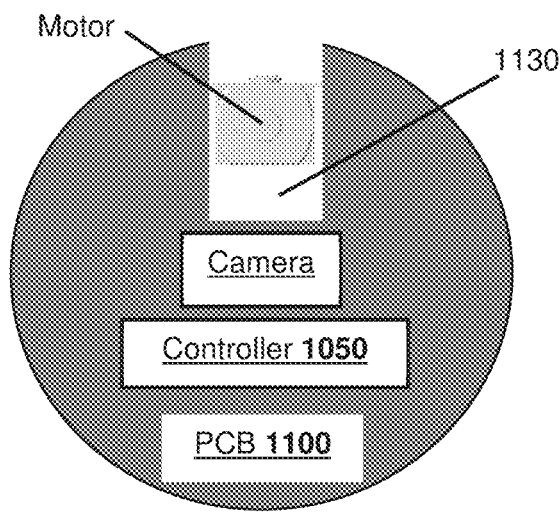
FIG. 11 depicts an embodiment of components of the system of FIG. 10.

Attention is now drawn to FIG. 11.

According to some embodiments, at least part of the system 1000 and at least part of the components of the underwater acquisition device 1020 are located on the same (e.g., single) printed circuit board (PCB) 1100. This enables obtaining a compact and efficient solution.

In the example of FIG. 11, the PCB 1100 embeds a camera (sensing part) of the underwater acquisition device 1020, and the controller 1050.

In this embodiment, the PCB 1100 comprises a hole 1130 (slot) which accommodates at least part of the actuator 1040. In this example, the hole 1130 accommodates the motor of the actuator 1040. The hole 1130 can be formed within the PCB 1100 (e.g., in the vicinity of the external periphery of the PCB 1100), and its dimensions can be selected to enable fitting at least part of the motor of the actuator 1040 in the hole 1130.

In some embodiments, the PCB can embed the sensor 1060.

Note that the PCB 1100 can embed additional components, or different components, which are not depicted in FIG. 11.

In some embodiments, the components can be located on different PCBs.

Figure 12:
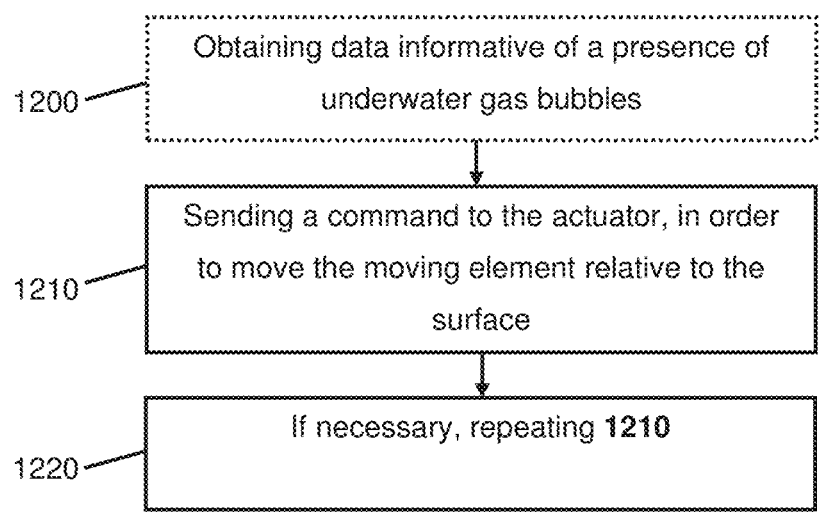
FIG. 12 depicts a generalized flow-chart of a method for removing underwater gas bubbles, which uses the system of FIG. 10.

Attention is now drawn to FIG. 12, which describes a method of dismissing or removing underwater gas bubbles, using e.g., the system of FIG. 10.

In some embodiments, the method can include obtaining (operation 1200) data informative of a presence of underwater gas bubbles on the surface 1010 associated with the underwater acquisition device 1020. Presence of underwater gas bubbles on the surface 1010 can be detected using image processing (e.g., using a computer vision algorithm) of one or more images acquired by the underwater acquisition device 1020 (or by another camera which is oriented towards the surface 1010). The image processing can involve usage of a trained machine learning model (for example a deep neural network, such as, but not limited to, a convolutional neural network) which has been trained (using e.g., supervised learning) to detect underwater gas bubbles in underwater images. The trained machine learning model can be implemented by a processor and memory circuitry (not represented in the drawings), which can be part of the system 1000, or can communicate with the system 1000. In some embodiments, it is not necessary to detect presence of gas bubbles, and the method of FIG. 12 is triggered automatically periodically (e.g., with a predefined periodicity). The certain periodicity can be equal to at least once in 5 minutes, at least once in 15 minutes, or at least once in 60 minutes. These values are not limitative.

The method further includes (operation 1210) sending a command to the actuator 1040, in order to move the moving element 1030 relative to the surface 1010. The command can be sent by the controller 1050.

During the motion of the moving element 1030 relative to the surface 1010, there is an interaction between at least part of the moving element 1030 and the surface 1010 and/or the underwater gas bubbles located on the surface 1010. Different embodiments for this interaction are provided hereinafter.

In some embodiments, a motion of the portion of the moving element 1030 in contact (direct physical contact) with the surface 1010 enables the portion to wipe the surface 1010 (on which the gas bubbles are located), thereby dismissing or removing underwater gas bubbles affixed to the surface 1010.

In some embodiments, there is contact between the at least part of the moving element 1030 during its motion and the underwater gas bubbles located on at least part of the surface. However, there is not necessarily direct contact between the at least part of the moving element 1030 and the surface 1010 during the motion of the moving element 1030.

In some embodiments, the moving element 1030 has a sweeping motion (wiping motion) at a distance from the underwater gas bubbles which is sufficiently small (below a threshold which can be determined e.g., experimentally) to enable said sweeping motion to dismiss or remove underwater gas bubbles from at least part of the surface. However, there is not necessarily direct contact between the at least part of the moving element 1030 and the gas bubbles during the motion of the moving element 1030 (and a fortiori, there is not necessarily direct contact between the at least part of the moving element 1030 and the surface 1010). Note that the velocity of the moving element 1030 during its motion can be controlled to improve removal of the gas bubbles.

In some embodiments, the moving element 1030 is controlled to be moved between two extreme positions. In each of these two extreme positions, the moving element 1030 does not obstruct the optical field of view of the camera of the underwater acquisition device 1020. When the moving element 1030 is moved from its first extreme position to its second extreme position, this enables a part of the moving element 1030 to interact with the surface 1010 or with the gas bubbles located on the surface 1010, thereby dismissing or removing underwater gas bubbles affixed to the surface 1010.

Note that data informative of a position of the moving element 1030 can be determined using data provided the sensor 1060. Assume that the moving element 1030 is initially at its first extreme position and is moved by the actuator 1040 towards its second extreme position. When the controller 1050 determines that the moving element 1030 has reached its second extreme position (or just before the moving element 1030 has reached its second extreme position), it instructs the actuator 1040 to stop moving the moving element 1030. This enables the moving element 1030 to reach its second extreme position and to remain static (at least temporarily) at its second extreme position.

In some embodiments, the operation of moving the moving element 1030 from its first extreme position to its second extreme position can be repeated the other way around. In other words, once the moving element 1030 has reached its second extreme position, the controller 1050 can send a command to the actuator 1040, in order to bring back the moving element 1030 to its first extreme position. When the controller 1050 determines that the moving element 1030 has been brought back to its first extreme position (or just before the moving element 1030 has reached its first extreme position), it instructs the actuator 1040 to stop moving the moving element 1030. This enables the moving element 1030 to reach its first extreme position and to remain static (at least temporarily) at its first extreme position.

The motion of the moving element 1030 relative to the surface 1010 between its two extreme positions can be repeated a plurality of times (see operation 1220).

The number of times the relative motion of the moving element 1030 is repeated within a short period of time can be predefined and/or can be selected by a user. In some embodiments, this motion can be repeated until data informative of an absence of underwater gas bubbles on the surface 1010 is obtained. This data can be provided by a trained machine learning model, which, as mentioned above, can detect whether underwater gas bubbles are present on the surface 1010 based on image(s) acquired by the underwater acquisition device 1020 (or by another camera which is oriented towards the surface 1010).

The two extreme positions can be selected to enable wiping, by the moving element 1030, of all or most of a portion of the surface 1010 which is located in the optical field of view of the underwater acquisition device 1020.

In a non-limitative example, the surface 1010 is hemispherical, and the moving element 1030 wipes most or all of the hemisphere.

Note that the motion of the moving element 1030 is not limited to a motion between its two extreme positions, and it is possible to move the moving element 1030 between any of two intermediate positions located between these two extreme positions. However, a motion between the two extreme positions has a larger amplitude, which therefore enables wiping a larger area of the surface of the surface 1010, and, in turn, enables to dismiss or remove more underwater gas bubbles.

According to some embodiments, the velocity and/or acceleration of the moving element 1030 during its motion can be controlled by the controller 1050, using the actuator 1040.

Figure 13A:
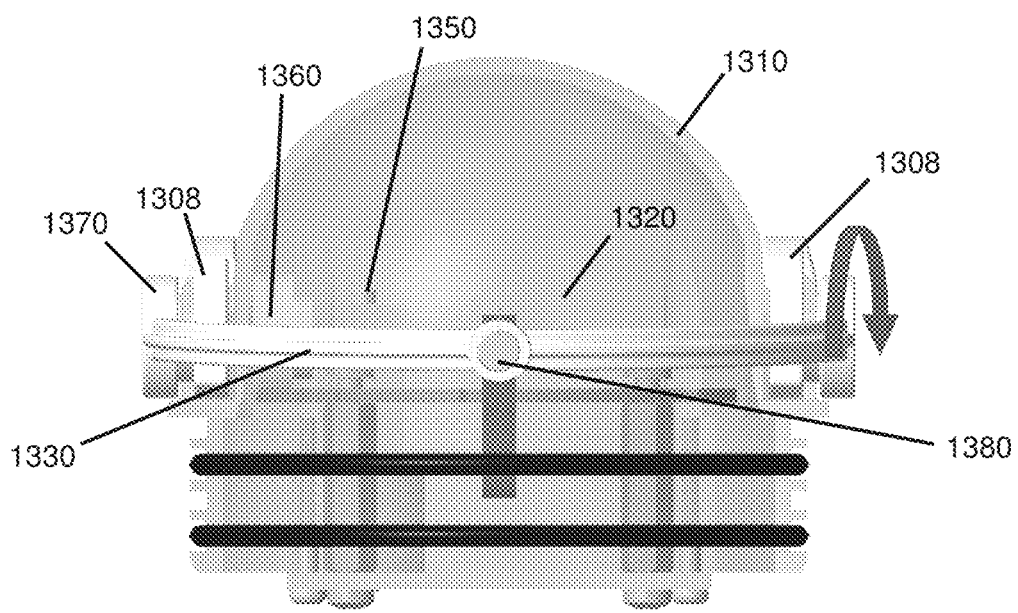
FIGS. 13A to 13C depict a particular embodiment of the system of FIG. 10.
Figure 13B:
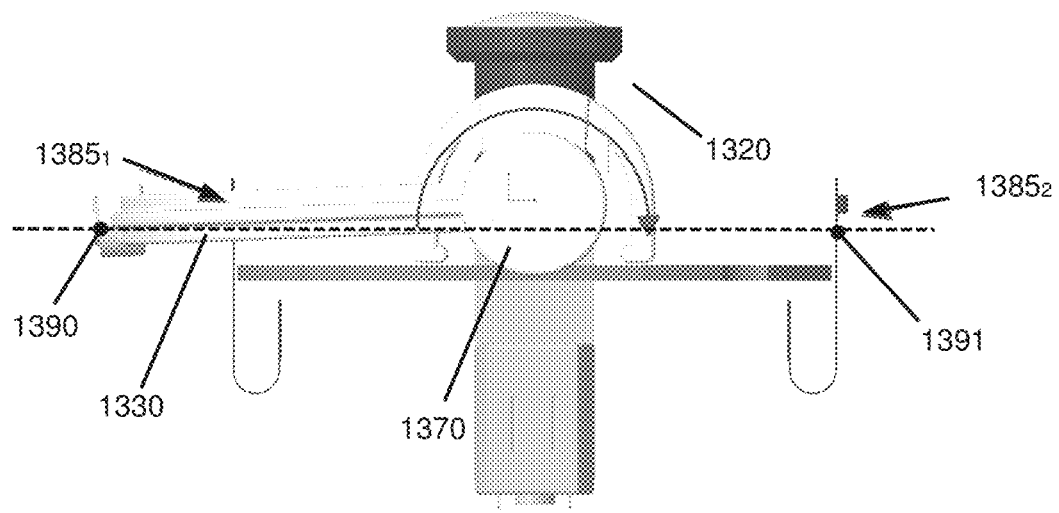
Figure 13C:
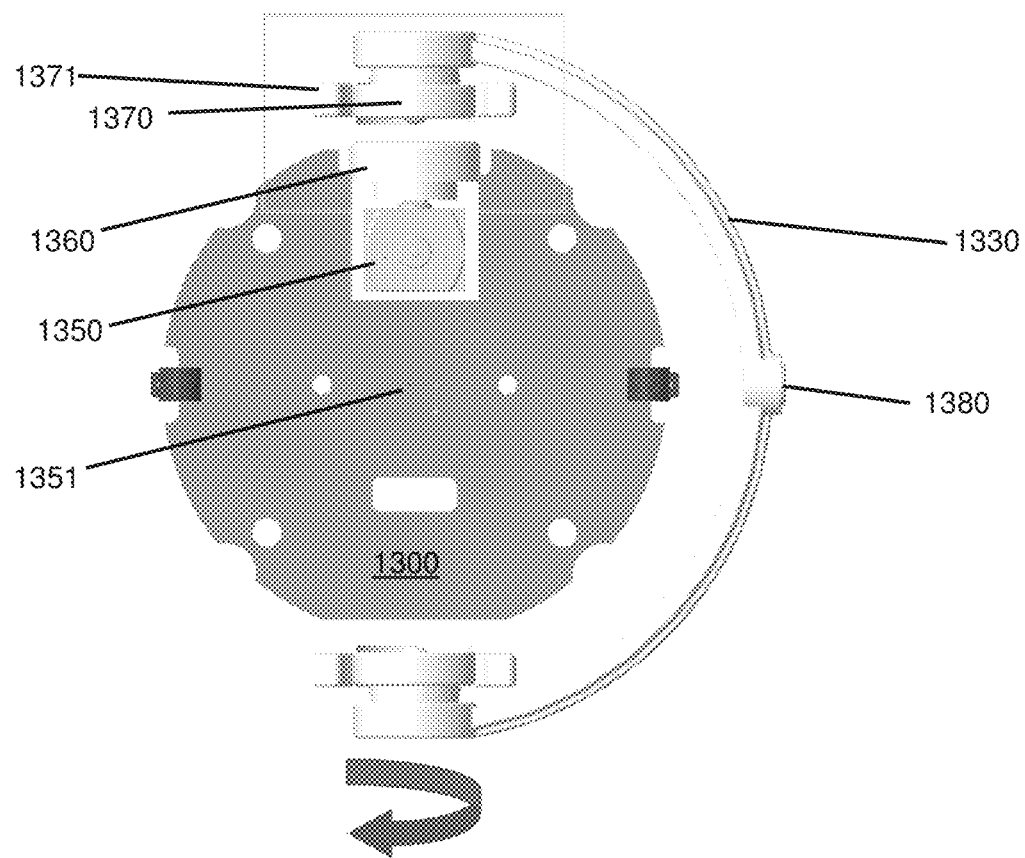

Attention is now drawn to FIGS. 13A to 13C.

In this embodiment, the moving element 1330 is a wiper. The wiper has an arcuate shape. In particular, the wiper can have a semi-circular shape. The wiper can rotate around a rotation axis and is therefore operative to wipe most or all of the hemispherical surface 1310 (e.g., dome) associated with the underwater acquisition device 1320. A mechanism 1308 (e.g., gears, located on both sides of the hemispherical surface 1310) can be used to enable the rotation of the wiper. The wiper can therefore follow at least part of a revolutionary motion (similarly to an eyelid).

The actuator 1340 includes a motor 1350, At least one first magnetic element 1360 is coupled to the motor 1350 and at least one second magnetic element 1370 is coupled to the moving element 1330.

When the motor 1350 is triggered, it induces a motion of the first magnetic element 1360. In particular, the first magnetic element 1360 is rotated along a rotation axis. A mechanical axis (e.g., gears) can couple the motor 1350 to the first magnetic element 1360. This induces a rotation of the second magnetic element 1370 (along the same rotation axis as the first magnetic element 1360). This is due to the fact that the first magnetic element 1360 and the second magnetic element 1370 are located in proximity one to the other. In particular, the second magnetic element 1370 is located at a sufficiently small distance from the first magnetic element 1360 to enable the magnetic field of the first magnetic element 1360 to actively operate on the second magnetic element 1370.

According to some embodiments, there is no direct physical coupling/physical contact between the first magnetic element 1360 and the second magnetic element 1370, but only a remote coupling which relies on magnetic force(s).

Therefore, the system for dismissing or removing underwater gas bubbles does not degrade waterproofness of the underwater acquisition device 1320, or of the enclosure in which the underwater acquisition device 1320 is located. Indeed, since there is no need to create a direct physical or mechanical coupling between the first magnetic element 1360 and the second magnetic element 1370, it is not necessary to create a hole or a channel within the surface 1310. Therefore, the waterproofness of the underwater acquisition device 1320, or of the enclosure in which the underwater acquisition device 1320, is maintained.

In the particular embodiment of FIGS. 13A to 13C, the first magnetic element 1360 is located within the enclosure (dome) in which the underwater acquisition device 1320 is located, whereas the second magnetic element 1370 is located outside of the enclosure in which the underwater acquisition device 1320 is located. In other words, although the first magnetic element 1360 and the second magnetic element 1370 are located in close proximity, the first magnetic element 1360 is located beneath the surface 1310 (in the waterproof enclosure), whereas the second magnetic element 1370 is located above the surface (in the water).

In some embodiments, it is possible to use at least two distinct first magnetic elements coupled to the motor. The two distinct first magnetic elements can be located on opposite sides within an enclosure in which the underwater acquisition device 1320 is located. Similarly, in some embodiments, it is possible to use at least two distinct second magnetic elements coupled to the moving element 1330. The two distinct second magnetic elements can be located on opposite sides outside of an enclosure in which the underwater acquisition device 1320 is located.

According to some embodiments, the moving element 1330 can embed a magnet 1380. In the embodiment of FIGS. 13A to 13C, the magnet 1380 is located at the central part of the arcuate shape of the moving element 1330. At least one magnetic sensor can be arranged to detect position of the magnet 1380. In the embodiment of FIGS. 13A to 13C, two magnetic sensors $1385_1$, $1385_2$ (such as, but not limited to, Hall sensors) can be arranged on opposite sides of the hemispherical surface. The two magnetic sensors $1385_1$, $1385_2$ can be located within the enclosure in which the underwater acquisition device 1320 is located.

When the first magnetic sensor $1385_1$ detects the magnet 1380 (with a detection signal which is above a threshold), this indicates that the moving element 1030 has reached its first extreme position 1390. When the second magnetic sensor $1385_2$ detects the magnet 1380 (with a detection signal above a threshold), this indicates that the moving element 1330 has reached its second extreme position 1391. As mentioned above with reference to FIG. 12, this can be used by the controller 1050 to control the motion of the moving element 1330 using the motor 1350, such that the moving element 1330 moves from its first extreme position 1390 towards its second extreme position 1391, or conversely.

As visible in FIG. 13C, a PCB 1300 can embed the camera 1351 of the underwater acquisition device 1320 and can include a hole (slot) in which at least part of the motor 1350 is located. The hole is located in the vicinity of the first magnetic element 1360, thereby enabling a coupling between the motor 1350 and the first magnetic element 1360. The PCB 1300 can also embed the two magnetic sensors $1385_1$, $1385_2$.

Note that the system as described above (which uses a moving element wiping the surface), can be combined with the system described with reference to FIGS. 2B, 2C, 3, 4, 5A and 5B. In this case, the two systems can be used in parallel, or alternatively, over time. This is however not mandatory.

Attention is now drawn to FIGS. 6 to 9, which depict examples in connection with the various embodiments of the invention (as described above—e.g., the electro-magnetic mechanism and/or the moving element). Although, the following examples illustrate the practice of some embodiments of the present invention, the examples should not be construed as limiting the scope of the invention. Other embodiments will be apparent to one skilled in the art from consideration of the specification and examples.

Figure 6:
FIG. 6 is a front view of an exemplary underwater bubble assembly on a dome before removing the bubbles as per the present invention.
Figure 7:
FIG. 7 is a front view of an exemplary underwater bubble assembly on a dome after removing the bubbles, according to embodiments of the present invention.

FIGS. 6 and 7 demonstrate removal of underwater bubbles using the methods according to the various embodiments of the present invention (as described above—using e.g., the electro-magnetic mechanism and/or the moving element) on a laboratory scale.

To run the test in the laboratory, a container was filled with tap water and the device of the present invention was inserted into the container. Air bubbles were generated using an air brush pump. Bubbles accumulated on the dome's cover were detected, and, after operating the device's rotating mechanism, the bubbles were noticed to leave the dome. The experiment was repeated 10 times, with the same result.

Figure 8:
FIG. 8 is another front view of an exemplary underwater bubble assembly on a dome before removing the bubbles, according to embodiments of the present invention.
Figure 9:
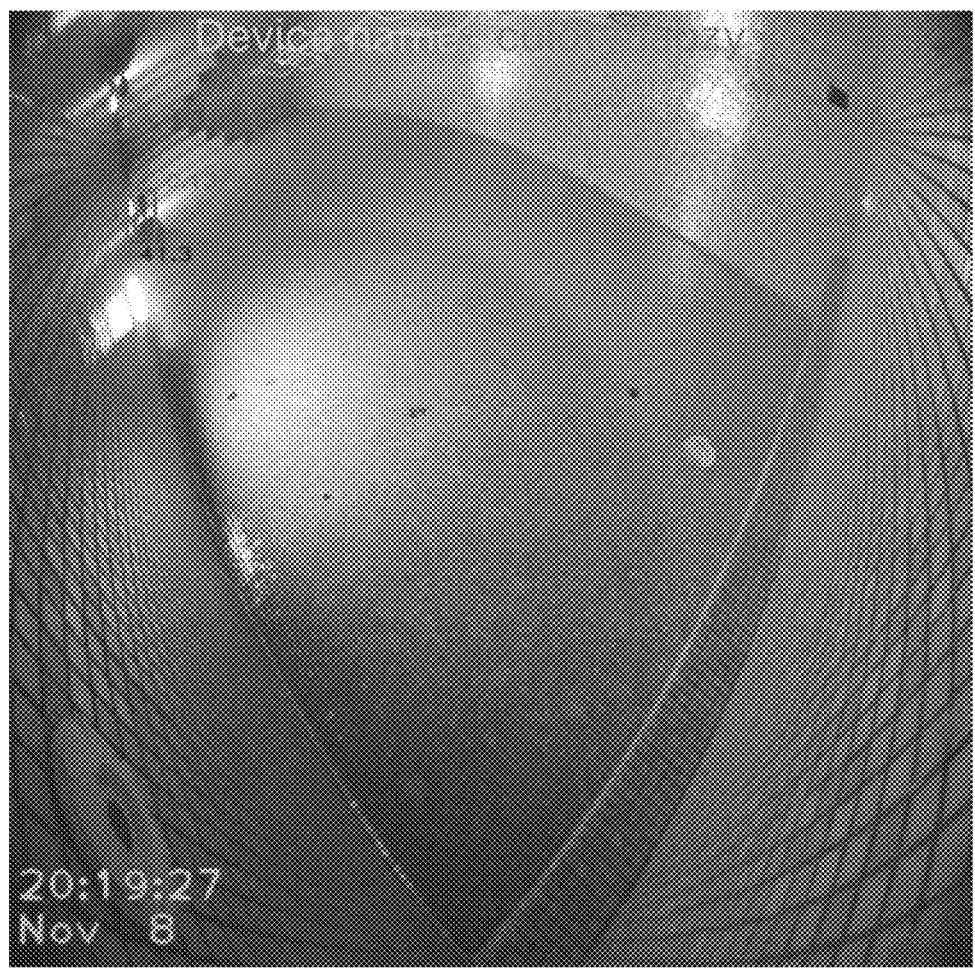
FIG. 9 is another front view of an exemplary underwater bubble assembly on a dome after removing the bubbles, according to embodiments of the present invention.

FIGS. 7 and 8 demonstrate removal of underwater bubbles using the methods according to the various embodiments of the present invention (as described above—using e.g., the electro-magnetic mechanism and/or the moving element) in a swimming pool.

To run the test in the swimming pool, the device according to some embodiments of the present invention was inserted into the water, and bubbles were accumulated on the dome's cover spontaneously. After operating the device's vibrating or rotating mechanism, the bubbles were noticed to leave the dome. The experiment was repeated 10 times, with the same result. Similar results are obtained using a moving element which is moved with respect to the surface of the dome.

Figure 14A:
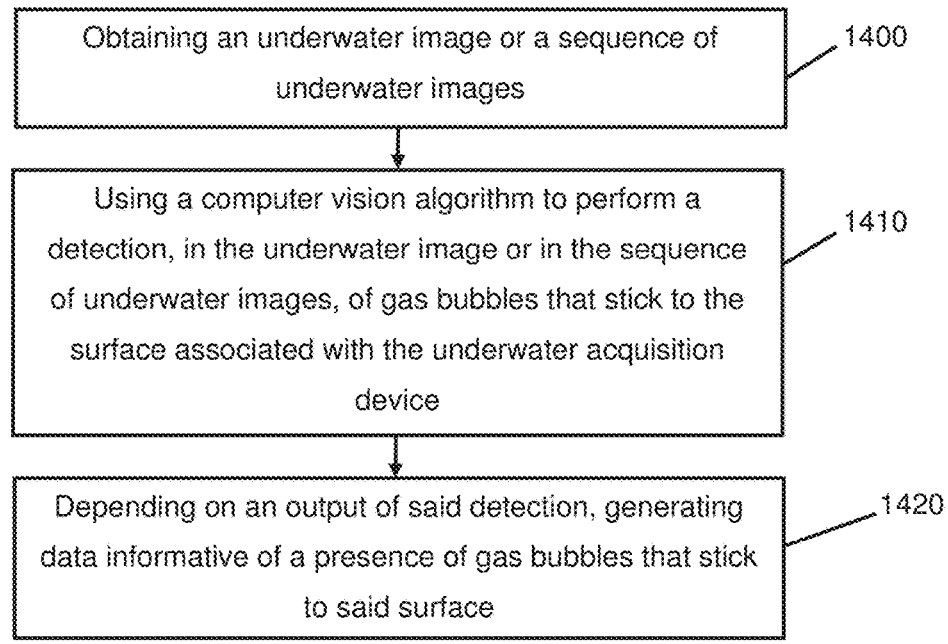
FIG. 14A depicts a generalized flow-chart of a method of detecting underwater gas bubbles on a surface associated with an underwater acquisition device.
Figure 14B:
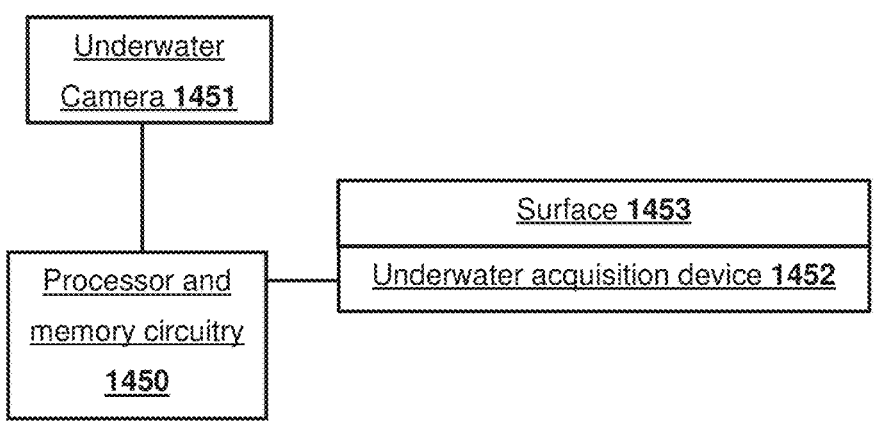
FIG. 14B depicts a generalized block diagram of a system which can be used to perform the method of FIG. 14A.

Attention is now drawn to FIGS. 14A and 14B.

The method of FIG. 14A can be performed using a processor and memory circuitry 1450.

The method includes (operation 1400) obtaining an underwater image or a sequence of underwater images. The underwater image or the sequence of underwater images can be acquired by an underwater camera 1451. The underwater camera 1451 can communicate data with the processor and memory circuitry 1450.

Assume that a surface 1453 is associated with an underwater acquisition device 1452. It is desired to detect whether underwater gas bubbles stick on this surface. Indeed, since this surface is located in an optical field of view of the underwater acquisition device 1452, this can degrade the quality of the images acquired by the underwater acquisition device 1452, As mentioned above, this underwater surface 1453 can correspond e.g., to an immersed surface of a dome covering the underwater acquisition device 1452, and/or to the surface of an optical element (e.g. optical lens) of the underwater acquisition device 1452, and/or to an immersed surface of an underwater acquisition device 1452, on which gas bubbles are formed.

Note that the underwater camera 1451 which provides the underwater image(s) can correspond to the underwater acquisition device 1452 (for which it is desired to remove the underwater gas bubbles), and/or can be different from the underwater acquisition device 1452. If the underwater camera 1451 is a different device, its field of view can be oriented towards the surface associated with the underwater acquisition device 1452.

The method further includes using (operation 1410) a computer vision algorithm to perform a detection, in the underwater image or in the sequence of underwater images, of gas bubbles that stick to the surface associated with the underwater acquisition device 1452.

According to some embodiments, the computer vision algorithm can involve usage of a trained machine learning model which has been trained (using e.g., supervised learning) to detect underwater gas bubbles in underwater images. The trained machine learning model (e.g., deep neural network, convolutional neural network, etc.) can be implemented by the processor and memory circuitry 1450.

Depending on an output of said detection, the method includes (operation 1420) generating data informative of a presence of gas bubbles that stick to said surface. According to some embodiments, if the presence of gas bubbles is detected (in some embodiments, this presence is detected when the number or concentration of bubbles is above a threshold), the method can include generating data which corresponds to an alert, transmitted to a user and/or to another system. In some embodiments, the alert can be indicative of the level of underwater bubbles present on the surface.

In some embodiments, the alert can include a visual and/or an audio alert. In some embodiments, the alert can be a command, or an instruction sent to a controller of a system which enables removal of underwater bubbles (the system can correspond e.g., to one of the embodiments described above—this is however not mandatory). This enables the controller to trigger removal of the underwater bubbles. Alternatively, the command can be sent directly to a mechanism which enables removal of the underwater gas bubbles.

It is to be understood that the invention is not limited in its application to the details set forth in the description contained herein or illustrated in the drawings.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A system operative to dismiss or remove underwater gas bubbles, the system comprising:
   a moving element operative to move with respect to at least part of an underwater surface associated with an underwater acquisition device,
   an actuator coupled to the moving element,
   wherein a control of a motion of the moving element using the actuator enables at least part of the moving element to interact with at least one of the underwater surface or the underwater gas bubbles, thereby dismissing or removing the underwater gas bubbles from at least part of the underwater surface,
   wherein the actuator includes a motor and at least one first magnetic element coupled to the motor, wherein the system comprises at least one second magnetic element coupled to the moving element,
   wherein:
   the at least one first magnetic element is located within a waterproof enclosure of the underwater acquisition device,
   the at least one second magnetic element is immersed in water, and
   a motion of the at least one first magnetic element enables a motion of the at least one second magnetic element using a remote magnetic force.

2. The system of claim 1, wherein said interaction includes:
   (i) a wiping of the underwater surface on which the underwater gas bubbles are located, by the at least part of the moving element, or
   (ii) a contact between the at least part of the moving element during its motion and the underwater gas bubbles located on at least part of the underwater surface, or
   (iii) a sweeping motion of the at least part of the moving element at a distance from the underwater gas bubbles which is sufficiently small to enable said sweeping motion to dismiss or remove the underwater gas bubbles from at least part of the underwater surface.

3. The system of claim 1, wherein the moving element has an arcuate shape.

4. The system of claim 1, wherein the system does not degrade waterproofness of the underwater acquisition device, or of an enclosure in which the underwater acquisition device is located.

5. The system of claim 1, comprising:
   (i) at least one sensor operative to provide data informative of a position of the moving element, or
   (ii) a magnet coupled to the moving element, and at least one magnetic sensor operative to detect the magnet, thereby providing data informative of a position of the moving element.

6. The system of claim 1, configured to perform (i) or (ii):
   (i) using a computer vision algorithm to perform a detection of underwater gas bubbles on the underwater surface, and
   using the detection to trigger the motion of the moving element with respect to the underwater surface, thereby dismissing or removing the underwater gas bubbles from at least part of the underwater surface; or
   (ii) automatically control the moving element to move with respect to said underwater surface, wherein said control is repeated over time with a certain periodicity.

7. The system of claim 1, comprising one or more fixing elements for coupling the moving element to the underwater surface, wherein the one or more fixing elements enable manual replacement of the moving element.

8. The system of claim 1, configured to rotate the moving element above the underwater surface from a first extreme position to a second extreme position, or conversely.

9. The system of claim 1, further comprising an electro-mechanical mechanism, wherein activation of the electro-mechanical mechanism is operative to:
   generate mechanical vibrations in the surface associated with the underwater acquisition device, or
   generate mechanical vibrations in an assembly coupled to the underwater acquisition device,
   said mechanical vibrations enabling dismissing or removing at least part of the underwater gas bubbles.

10. The system of claim 9, further comprising a processor and memory circuitry configured to detect presence of the underwater gas bubbles gas bubbles that stick to the underwater surface associated with the underwater acquisition device, using a computer vision algorithm.

11. The system of claim 9, wherein the electro-mechanical mechanism is directly or indirectly coupled to, or in a vicinity of the underwater acquisition device.

12. The system of claim 9, wherein the electro-mechanical mechanism includes a vibrating unbalanced DC motor, or a piezoelectric transducer, or a solenoid, or an ultrasonic device.

13. The system of claim 9, wherein the electro-mechanical mechanism is a vibrating or rotating mechanism, wherein the system is configured to:
   a) operate the vibrating or rotating mechanism for a time period sufficient to remove a majority of the underwater gas bubbles; and
   b) optionally repeat step a), until complete removal or dismissal of the underwater gas bubbles is achieved.

14. The system of claim 9, wherein the electro-mechanical mechanism is a vibrating or rotating mechanism, wherein the system is configured to perform (i) or (ii):
   (i)
   a) acquire an underwater image or a sequence of underwater images and apply a computer vision algorithm to the underwater image or to the sequence of underwater images for detecting the underwater gas bubbles that stick to the underwater surface associated with the underwater acquisition device,
   b) responsive to said detecting, automatically operate the vibrating or rotating mechanism to remove at least part of the underwater gas bubbles from the surface associated with the underwater acquisition device, and c) optionally repeat step b) until complete removal or dismissal of the underwater gas bubbles is achieved, or (ii)

a) acquire an underwater image or a sequence of underwater images and feed the underwater image or a sequence of underwater images to a machine learning algorithm for detecting the underwater gas bubbles that stick to the underwater surface associated with the underwater acquisition device, b) responsive to said detecting, automatically operate the vibrating or rotating mechanism to remove at least part of the underwater gas bubbles from the underwater surface associated with the underwater acquisition device, and c) optionally repeat step b) until complete removal or dismissal of the underwater gas bubbles is achieved.

15. The system of claim 9, configured to periodically activate the electro-mechanical mechanism, with a constant duty cycle.

16. A method of dismissing or removing underwater gas bubbles, comprising:

controlling a motion of a moving element to make the moving element interact with at least one of:

an underwater surface associated with an underwater acquisition device, or the underwater gas bubbles, thereby dismissing or removing the underwater gas bubbles from at least part of the underwater surface, wherein controlling the motion of the moving element comprises generating a motion of at least one first magnetic element located within a waterproof enclosure of the underwater acquisition device, wherein a motion of the at least one first magnetic element enables a motion of at least one second magnetic element using a remote magnetic force, wherein the at least one second magnetic element is coupled to the moving element and is immersed in water.

17. The method of claim 16, wherein said interaction includes:

(i) a wiping of the underwater surface on which the underwater gas bubbles are located, by the at least part of the moving element, or (ii) a contact between at least part of the moving element during its motion and the underwater gas bubbles located on at least part of the underwater surface, or (iii) a sweeping motion of the at least part of the moving element at a distance from the underwater gas bubbles which is sufficiently small to enable said sweeping motion to dismiss or remove the underwater gas bubbles from at least part of the surface.

18. The method of claim 16, wherein:

(i) the moving element has an arcuate shape, or (ii) the method comprises determining data informative of a position of the moving element.

19. The method of claim 16, comprising performing (i) or (ii):

(i) using a computer vision algorithm to perform a detection of the underwater gas bubbles on the underwater surface, and using the detection to trigger the motion of the moving element with respect to the underwater surface, thereby dismissing or removing the underwater gas bubbles from at least part of the underwater surface; or (ii) automatically controlling the moving element to move with respect to said underwater surface, wherein said control is repeated over time with a certain periodicity.

20. A non-transitory computer-readable memory tangibly embodying a program of instructions executable by one or more computers to perform:

controlling an actuator to trigger a motion of a moving element enabling the moving element to interact with at least one of:

an underwater surface associated with an underwater acquisition device, or underwater gas bubbles, thereby dismissing or removing the underwater gas bubbles from at least part of the underwater surface, wherein said controlling enables generating a motion of at least one first magnetic element located within a waterproof enclosure of the underwater acquisition device, wherein a motion of the at least one first magnetic element enables a motion of at least one second magnetic element using a remote magnetic force, wherein the at least one second magnetic element is coupled to the moving element and is immersed in water.

* * * * *